(12) United States Patent
Park et al.

(10) Patent No.: US 12,441,660 B2
(45) Date of Patent: Oct. 14, 2025

(54) DIELECTRIC MATERIAL AND MULTILAYER CERAMIC ELECTRONIC COMPONENT INCLUDING THE SAME

(71) Applicant: SAMSUNG ELECTRO-MECHANICS CO., LTD., Suwon-si (KR)

(72) Inventors: Jae Sung Park, Suwon-si (KR); Hee Sun Chun, Suwon-si (KR); In Tae Seo, Suwon-si (KR); Hyung Joon Jeon, Suwon-si (KR); Chung Eun Lee, Suwon-si (KR); Jong Han Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 781 days.

(21) Appl. No.: 17/523,249

(22) Filed: Nov. 10, 2021

(65) Prior Publication Data
US 2022/0204407 A1 Jun. 30, 2022

(30) Foreign Application Priority Data
Dec. 31, 2020 (KR) .................. 10-2020-0189832

(51) Int. Cl.
*B32B 15/04* (2006.01)
*B32B 17/06* (2006.01)
(Continued)

(52) U.S. Cl.
CPC ......... *C04B 35/4682* (2013.01); *H01C 1/148* (2013.01); *H01C 7/008* (2013.01);
(Continued)

(58) Field of Classification Search
CPC .................. C04B 35/4682; H01G 4/1227
(Continued)

(56) References Cited

U.S. PATENT DOCUMENTS 5,225,960 A 7/1993 Kishi et al.
5,734,545 A 3/1998 Sano et al.
(Continued)

FOREIGN PATENT DOCUMENTS

JP 5558249 B2 7/2014
JP 2019-041092 A 3/2019
(Continued)

OTHER PUBLICATIONS

Hiroshi Kishi, et al., "Base-Metal Electrode-Multilayer Ceramic Capacitors: Past, Present and Future Perspectives", Jpn. J. Appl. Phys. vol. 42, Jan. 2003, pp. 1-15.
(Continued)

*Primary Examiner* — Lauren R Colgan
(74) *Attorney, Agent, or Firm* — MORGAN, LEWIS & BOCKIUS LLP

(57) ABSTRACT

A dielectric material includes a main component represented by $(Ba_{1-x}Ca_x)(Ti_{1-y}(Zr, Sn, Hf)_y)O_3$ ($0 \leq x \leq 1$ and $0 \leq y \leq 0.5$); a first subcomponent including at least one of elements among Y, Dy, Ho, Er, Gd, Ce, Nd, Nb, Sm, Tb, Eu, Tm, La, Lu, and Yb; a second subcomponent including Si and/or Al; and a third subcomponent including Ba and/or Ca.

14 Claims, 3 Drawing Sheets

(51) Int. Cl.

| | |
|---|---|
| *C04B 35/468* | (2006.01) |
| *H01C 1/148* | (2006.01) |
| *H01C 7/00* | (2006.01) |
| *H01C 7/10* | (2006.01) |
| *H01F 27/28* | (2006.01) |
| *H01F 27/29* | (2006.01) |
| *H01G 4/12* | (2006.01) |
| *H01G 4/232* | (2006.01) |
| *H01G 4/248* | (2006.01) |
| *H01G 4/30* | (2006.01) |
| *H10N 30/87* | (2023.01) |

(52) U.S. Cl.
CPC ........... *H01C 7/10* (2013.01); *H01F 27/2804* (2013.01); *H01F 27/29* (2013.01); *H01G 4/1227* (2013.01); *H01G 4/232* (2013.01); *H01G 4/248* (2013.01); *H01G 4/30* (2013.01); *H10N 30/87* (2023.02); *C04B 2235/401* (2013.01); *C04B 2235/428* (2013.01); *C04B 2235/781* (2013.01); *C04B 2235/785* (2013.01); *C04B 2235/85* (2013.01); *H01F 2027/2809* (2013.01)

(58) Field of Classification Search
USPC .................................................. 428/701, 702
See application file for complete search history.

(56) References Cited

U.S. PATENT DOCUMENTS

| | | |
|---|---|---|
| 5,742,473 A | 4/1998 | Sano et al. |
| 5,815,368 A | 9/1998 | Sakamoto et al. |
| 5,818,686 A | 10/1998 | Mizuno et al. |
| 5,862,034 A | 1/1999 | Sato et al. |
| 6,243,254 B1 | 6/2001 | Wada et al. |
| 6,346,497 B1 | 2/2002 | Nakamura et al. |
| 6,380,116 B1 | 4/2002 | Okamatsu et al. |
| 6,485,672 B1 | 11/2002 | Nomura et al. |
| 6,548,437 B2 | 4/2003 | Sato et al. |
| 2002/0013213 A1* | 1/2002 | Sato .................... H01G 4/1227 501/139 |
| 2019/0066920 A1 | 2/2019 | Kim et al. |
| 2020/0251242 A1 | 8/2020 | Kwon et al. |
| 2020/0258685 A1* | 8/2020 | Ham .................... H01G 4/1227 |
| 2020/0395175 A1 | 12/2020 | Kim et al. |

FOREIGN PATENT DOCUMENTS

| | | |
|---|---|---|
| JP | 2020-205411 A | 12/2020 |
| KR | 10-2010-0131370 A | 12/2010 |
| KR | 10-2019-0124632 A | 11/2019 |
| KR | 10-2020-0096019 A | 8/2020 |

OTHER PUBLICATIONS

Office Action issued in corresponding Japanese Patent Application No. 2021-183045 dated Sep. 2, 2025, with English translation.

* cited by examiner

DIELECTRIC MATERIAL AND MULTILAYER CERAMIC ELECTRONIC COMPONENT INCLUDING THE SAME

CROSS-REFERENCE TO RELATED APPLICATION

This application claims benefit of priority to Korean Patent Application No. 10-2020-0189832 filed on Dec. 31, 2020 in the Korean Intellectual Property Office, the disclosure of which is incorporated herein by reference in its entirety.

TECHNICAL FIELD

The present disclosure relates to a dielectric material and a multilayer ceramic electronic component including the dielectric material.

BACKGROUND

Recently, according to the trend for the miniaturization of electronic products, multilayer ceramic electronic components are also required to be miniaturized and have high capacitance. Dielectric sheets of multilayer ceramic electronic components are also becoming thinner to meet the demand for miniaturization and large capacitance of multilayer ceramic electronic components.

Meanwhile, it is known that withstand voltage characteristics or the like of electronic components are significantly affected by a microstructure inside the components. As a dielectric sheet has increasingly been thinned, a size of grains and a distribution of components of the dielectric layer are affected, which leads to a problem in that withstand voltage and reliability characteristics of chips may be deteriorated. In general, grain boundaries between grains of electronic components have a high resistance component, and thus, research has been conducted to provide electronic components having high reliability by increasing a ratio of grain boundaries inside a dielectric layer.

However, problems of deterioration of product reliability, high-temperature withstand voltage characteristics, and DC-bias characteristics due to thinning of the dielectric layer based on miniaturization/ultra-high capacitance of electronic components still exist. In addition, there is an increasing need for characteristics of realizing a high effective dielectric constant or capacitance under a condition in which DC-bias is applied, while preventing the deterioration in reliability and the like mentioned above.

SUMMARY

An aspect of the present disclosure may provide a dielectric material and a multilayer ceramic electronic component having a high dielectric constant and excellent withstand voltage characteristics.

An aspect of the present disclosure may also provide a dielectric material and a multilayer ceramic electronic component having excellent high temperature reliability.

An aspect of the present disclosure may also provide a dielectric material and a multilayer ceramic electronic component in which a secondary phase can be controlled, while providing excellent dielectric density and uniformity of a microstructure.

According to an aspect of the present disclosure, a dielectric material may include: a main component (or main ingredient) represented by $(Ba_{1-x}Ca_x)(Ti_{1-y}(Zr, Sn, Hf)_y)O_3$ ($0 \leq x \leq 1$ and $0 \leq y \leq 0.5$); a first subcomponent (or first accessory ingredient) including at least one of elements among Y, Dy, Ho, Er, Gd, Ce, Nd, Sm, Nb, Tb, Eu, Tm, La, Lu, and Yb; a second subcomponent including Si and/or Al; and a third subcomponent including Ba and/or Ca, and at least two of the relational expressions 1 to 6 below may be satisfied.

According to an aspect of the present disclosure, a dielectric material may include: a main component represented by $(Ba_{1-x}Ca_x)(Ti_{1-y}(Zr, Sn, Hf)_y)O_3$ ($0 \leq x \leq 1$ and $0 \leq y \leq 0.5$); and a plurality of grains with a second subcomponent including S1 Si and/or Al coated on a surface thereof and a grain boundary disposed between two or more grains. An average diameter D1 of a core portion of the grains is 5 nm or more and 100 nm or less, and an average diameter D2 of the grains is 50 nm or more and 600 nm or less.

According to another aspect of the present disclosure, a multilayer ceramic electronic component may include: a ceramic body including a dielectric layer and first and second internal electrodes; and first and second external electrodes disposed on an external surface of the ceramic body and connected to the first and second internal electrodes, respectively, wherein the dielectric layer includes: a main component represented by $(Ba_{1-x}Ca_x)(Ti_{1-y}(Zr, Sn, Hf)_y)O_3$ ($0 \leq x \leq 1$ and $0 \leq y \leq 0.5$); a first subcomponent including at least one of elements among Y, Dy, Ho, Er, Gd, Ce, Nd, Sm, Nb, Tb, Eu, Tm, La, Lu, and Yb; a second subcomponent including Si and/or Al; and a third subcomponent including Ba and/or Ca, and at least two of the relational expressions 1 to 6 below may be satisfied.

$0.162 \leq M_{Tb}/M_{Dy} \leq 1.20$     [Relational Expression 1].

$0.176 \leq M_{Gd}/M_{Dy} \leq 0.60$     [Relational Expression 2].

$0.081 \leq M_{Sm}/M_{Dy} \leq 0.176$     [Relational Expression 3].

$0.081 \leq M_{Nb}/M_{Dy} \leq 0.176$     [Relational Expression 4].

$0.60 \leq M_2/M_1 \leq 1.36$     [Relational Expression 5].

$0.263 \leq M_3/M_2 \leq 0.455$     [Relational Expression 6].

In Relational Expressions 1 to 4, $M_{Tb}$, $M_{Dy}$, $M_{Gd}$, $M_{Sm}$ and $M_{Nb}$ are the numbers of moles of Tb, Dy, Gd, Sm, and Nb of the first subcomponent with respect to 100 moles which is a sum of B site elements of the main component, respectively, and in Relational Expressions 5 and 6, $M_1$ is a total number of moles of the first subcomponent with respect to 100 moles of Ti of the main component, $M_2$ is a total number of moles of the second subcomponent with respect to 100 moles of Ti of the main component, and $M_3$ is a total number of moles of the third subcomponent with respect to 100 moles which is the sum of the B site elements of the main component.

According to another aspect of the present disclosure, a multilayer ceramic electronic component may include: a ceramic body including a dielectric layer and first and second internal electrodes; and first and second external electrodes disposed on an external surface of the ceramic body and connected to the first and second internal electrodes, respectively. The dielectric layer may include: a main component represented by $(Ba_{1-x}Ca_x)(Ti_{1-y}(Zr, Sn, Hf)_y)O_3$ ($0 \leq x \leq 1$ and $0 \leq y \leq 0.5$), and a plurality of grains with a second subcomponent including Si and/or Al coated on a surface thereof and a grain boundary disposed between two or more grains. An average diameter D1 of a core portion of the grains may be 5 nm or more and 100 nm or less, and an average diameter D2 of the grains is 50 nm or more and 600 nm or less.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
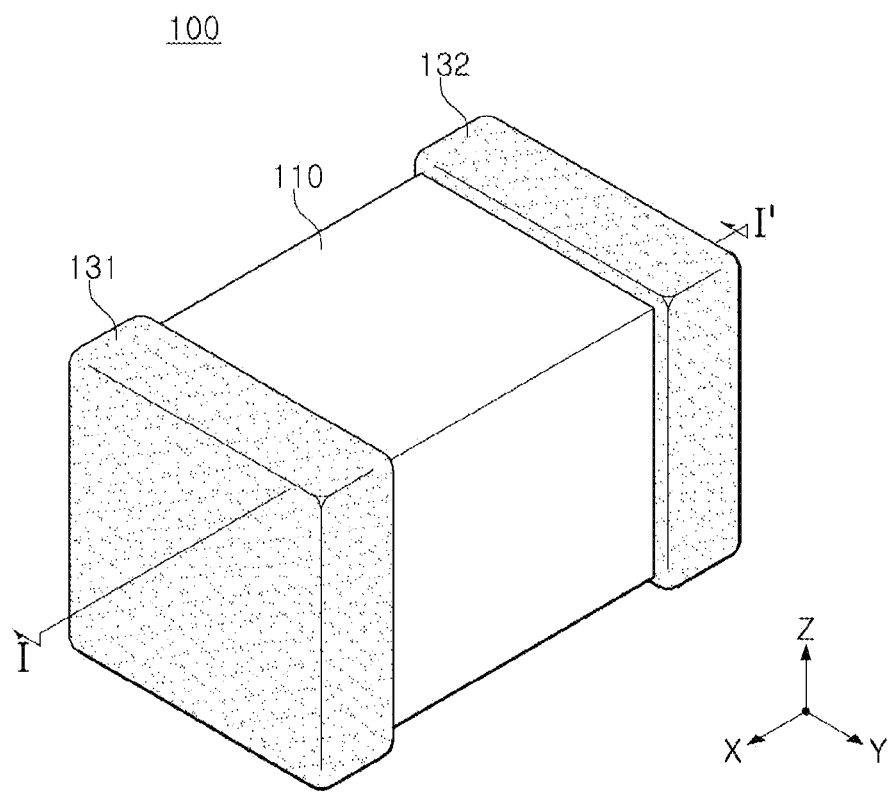
FIG. 1 is a perspective view schematically illustrating a multilayer ceramic electronic component according to an exemplary embodiment in the present disclosure.

Exemplary embodiments of the present disclosure will now be described in detail with reference to the accompanying drawings.

In the drawings, an X direction may be defined as a first direction, an L direction, or a length direction, a Y direction may be defined as a second direction, a W direction, or a width direction, and a Z direction may be defined as a third direction, a T direction, or a thickness direction.

The present disclosure relates to a dielectric material, and the dielectric material according to the present disclosure is applied to an electronic component, and an electronic component including the dielectric material of the present disclosure may include a capacitor, inductor, a piezoelectric element, a varistor, or a thermistor, but is not limited thereto.

A dielectric according to an exemplary embodiment in the present disclosure may include: a main component represented by $(Ba_{1-x}Ca_x)(Ti_{1-y}(Zr, Sn, Hf)_y)O_3$ ($0 \leq x \leq 1$ and $0 \leq y \leq 0.5$); a first subcomponent including at least one of elements among Y, Dy, Ho, Er, Gd, Ce, Nd, Sm, Nb, Tb, Eu, Tm, La, Lu, and Yb; a second subcomponent including Si and/or Al; and a third subcomponent including Ba and/or Ca, and at least two of the relational expressions 1 to 6 below may be satisfied.

$0.162 \leq M_{Tb}/M_{Dy} \leq 1.20$  [Relational Expression 1]

$0.176 \leq M_{Gd}/M_{Dy} \leq 0.60$  [Relational Expression 2]

$0.081 \leq M_{Sm}/M_{Dy} \leq 0.176$  [Relational Expression 3]

$0.081 \leq M_{Nb}/M_{Dy} \leq 0.176$  [Relational Expression 4]

$0.60 \leq M_2/M_1 \leq 1.36$  [Relational Expression 5]

$0.263 \leq M_3/M_2 \leq 0.455$  [Relational Expression 6]

In Relational Expressions 1 to 4, $M_{Tb}$, $M_{Dy}$, $M_{Gd}$, $M_{Sm}$ and $M_{Nb}$ is the number of moles of each component of the first subcomponent with respect to 100 moles which is the sum of B site elements of the main component ("B site" may refer to a 6-coordinated site occupied by Ti among the A site and B site of the BT-based perovskite material), and in Relational Expressions 5 and 6, $M_1$ is a total number of moles of the first subcomponent with respect to 100 moles of Ti of the main component, $M_2$ is a total number of moles of the second subcomponent with respect to 100 moles of Ti of the main component, and $M_3$ is a total number of moles of the third subcomponent with respect to 100 moles of Ti which is the sum of the B site elements of the main component. In one example, the expression $M_{Xy}$ may present the number of moles of element Xy with respect to 100 moles which is the sum of B site elements of the main component.

In general, mobility of electrical charges may be lowered using a potential barrier at an interface by increasing a fraction of grain boundaries in a dielectric material including grains and grain boundaries. To this end, in order to increase the fraction of grain boundaries, dielectric materials having a small grain distribution have been studied. However, as a thickness of the dielectric material decreases, electric field strength increases rapidly and a phenomenon in which the Schottky barrier decreases relatively often occurs. For this reason, it is difficult to ensure reliability of the dielectric material in an ultra-thin layer environment only by controlling the grain distribution.

In addition, the interiors of the grains, are fired in a reducing atmosphere to prevent oxidation of electrodes, etc. in a manufacturing process of electronic components, and oxygen vacancies and electrons are formed due to a low partial pressure of oxygen. Therefore, in order to improve reliability of the inside of the grains in an ultrathin layer environment, it is necessary to control both ionic conductivity due to oxygen vacancies and electronic conductivity of electrons/holes, etc.

The present inventors found that the Schottky barrier could be strengthened by distributing components having a high work function compared to a work function of a main component evenly in grain boundaries, while reducing the amount of generated electrical charge itself, by minimizing oxygen vacancies, a main factor of a degradation of insulation resistance (IR) of electronic components through Relational Expressions 1 to 6 above. The dielectric material according to an exemplary embodiment in the present disclosure satisfies two or more of Relational Expressions 1 to 6 above, thereby minimizing flow of electrical charges moving through the grain boundaries, and allows the inside of the grains to have a high n-type tendency, thereby suppressing a conduction phenomenon inside the grains.

In one example of the present disclosure, the dielectric material according to the present disclosure may satisfy at least two of Relational Expressions 1 to 4 above. In the present disclosure, satisfying at least two relational expressions may refer to either satisfying two relational expressions among the subject relational expressions or satisfying three or more relational expressions.

Among the relational expressions, Relational Expressions 1 to 4 may be related to the amount of electrical charges generated inside the grains. A rare earth element tends to act as a donor when substituted at an A site and tends to act as an acceptor when substituted at a B site. Here, an ion radius may be an important factor in determining to which position of the A site and/or the B site the rare earth element is to be substituted. Therefore, amphoteric elements such as Dy or Tb are selectively substituted at the A site or the B site, and Ho, Y, etc. having an ionic radius of an intermediate size may serve to balance acceptors and donors. In addition, elements having a relatively larger ionic radius than Dy tend to function as donors, and the balance of the A site may be adjusted using elements such as Gd, Sm, and Nb together with Dy and/or Y. Meanwhile, when the above components are used excessively, reliability of the electronic component may rather be degraded. Therefore, when at least two of Relational Expressions 1 to 4 are satisfied, like the dielectric material of this example, an occurrence of oxygen vacancies inside the grains may be minimized to suppress an occurrence of electrical charges.

In an exemplary embodiment in the present disclosure, the dielectric material according to the present disclosure may satisfy Relational Expressions 5 and 6 described above.

Among the above relational expressions, Relational Expressions 5 and 6 relate to charge transfer of grain boundaries. As described above, the related art uses a method of increasing the high resistance component by increasing the fraction of the grain boundary by reducing the size of the grain boundary. However, when the above Relational Expressions 5 and/or 6 are satisfied, the second subcomponent having a high work function may be evenly distributed at the interface of the grains, thereby suppressing the emission of electrical charges. In addition, in order to balance a dielectric constant and a bulk resistance value, all the contents of the third subcomponent for controlling a sintering temperature, etc. and/or the first subcomponent for suppressing the charge transfer inside the grains should be considered. Outside of the range, the dielectric constant and reliability may be degraded.

In an example, the dielectric material according to the present disclosure may satisfy one of Relational Expressions 1 to 4 and may satisfy one of Relational Expressions 5 and 6. In this case, it is possible to implement both the bulk resistance inside the grains and the suppression of charge emissions at the grain boundaries.

In another example, the dielectric material according to the present disclosure may satisfy at least two of Relational Expressions 1 to 4 and satisfy Relational Expressions 5 and 6. That is, the dielectric material according to the present disclosure may satisfy two or more of Relational Expressions 1 to 4, and, at the same time, satisfy both Relational Expressions 5 and 6. In the case of this example, it is possible to further increase reliability of the inside the grains and grain boundaries.

In an exemplary embodiment in the present disclosure, the dielectric material according to the present disclosure may satisfy all of Relational Expressions 1 to 6 above. In this case, it is possible to maximize the suppression of charge occurrence and conduction inside the grains and high resistance of the grain boundaries.

In another exemplary embodiment in the present disclosure, Relational Expressions 1 to 4 above may correspond to Relational Expressions 1-1 to 4-1 below, respectively.

$$0.108 \leq (M_{Tb}/M_{Dy})/M_3 \leq 0.800 \quad [\text{Relational Expression 1-1}]$$

$$0.118 \leq (M_{Gd}/M_{Dy})/M_3 \leq 0.400 \quad [\text{Relational Expression 2-1}]$$

$$0.054 \leq (M_{Sm}/M_{Dy})/M_3 \leq 0.118 \quad [\text{Relational Expression 3-1}]$$

$$0.054 \leq (M_{Nb}/M_{Dy})/M_3 \leq 0.118 \quad [\text{Relational Expression 4-1}]$$

In Relational Expressions 1-1 to 4-1, $M_{Tb}$, $M_{Dy}$, $M_{Gd}$, $M_{Sm}$, $M_{Nb}$, and $M_3$ may have the same meaning as described above. That is, $M_{Tb}$, $M_{Dy}$, $M_{Gd}$, $M_{Sm}$ and $M_{Nb}$ is the number of moles of each component of the first subcomponent with respect to 100 moles which is the sum of B site elements of the main component, and $M_3$ is a total number of moles of the third subcomponent with respect to 100 moles which is the sum of the B site elements of the main component.

The dielectric material according to the present exemplary embodiment may additionally satisfy a corresponding relational expression among Relational Expressions 1-1 to 4-1 when any one or more of Relational Expressions 1 to 4 is satisfied. That Relational Expressions 1 to 4 correspond to Relational Expressions 1-1 to 4-1, respectively, may mean that Relational Expression 1 and Relational Expression 1-1 correspond to each other, Relational Expression 2 and Relational Expression 2-1 correspond to each other, and Relational Expression 3 and Relational Expression 3-1 correspond to each other, and Relational Expression 4 and Relational Expression 4-1 correspond to each other. That is, in the present exemplary embodiment, when the dielectric material satisfies Relational Expression 1, it may mean that Relational Expression 1-1 is also satisfied.

The Relational Expressions 1-1 to 4-1 may relate to an optimum range of components for suppressing an occurrence of electrical charges in the grains described above. The first subcomponent of the dielectric material according to the present disclosure serves to reduce conduction in the grains by suppressing an occurrence of oxygen vacancies through balance of donors and acceptors. In particular, when the first subcomponents are substituted at an A site and function as donors, they are effective in reducing the concentration of oxygen vacancies, but when used over a certain amount, excessive semiconductorization may occur due to an increase in electron concentration, resulting in a problem that insulation resistance is rapidly reduced. Therefore, Relational Expressions 1-1 to 4-1 represent an appropriate range of the content of the first subcomponent acting on a Ba-site, that is, the A site, and bulk resistance in the grains may be increased as much as possible by satisfying Relational Expressions 1-1 to 4-1.

The dielectric material according to an exemplary embodiment in the present disclosure includes a main component and a subcomponent, and the subcomponent may include at least one of first to sixth subcomponents. In the present disclosure, the term "main component" may refer to a component that occupies a relatively large weight ratio compared to other components, and may refer to a component of 50 w % or more based on the weight of the entire dielectric material. In addition, "subcomponent" may refer to a component that occupies a relatively small weight ratio compared to other components, and may refer to a component less than 50 w % based on the weight of the entire dielectric material.

Hereinafter, each component of the dielectric material according to an exemplary embodiment in the present disclosure will be described in more detail.

a) Main Component

The dielectric material may include a main component represented by $(Ba_{1-x}Ca_x)(Ti_{1-y}(Zr, Sn, Hf)_y)O_3$ ($0 \leq x \leq 1$, $0 \leq y \leq 0.5$). The main component may be, for example, a chemical in which Ca, Zr, Sn and/or Hf is partially dissolved in $BaTiO_3$. In the above composition formula, x may be in the range of 0 or more and 1 or less and y may be in the range of 0 or more and 0.5 or less, but is not limited thereto. For example, when x is 0, y is 0, and z is 0 in the above composition formula, the main component may be $BaTiO_3$.

b) First Subcomponent

According to an exemplary embodiment in the present disclosure, the dielectric material according to the present disclosure may include a first subcomponent including at least one element among Y, Dy, Ho, Er, Gd, Ce, Nd, Sm, Nb, Tb, Eu, Tm, La, Lu, and Yb.

The first subcomponent may be included in a range of 0.3 parts by mole or more and 5.4 parts by mole or less with respect to a total 100 moles of the B site elements of the main component. The content of the first subcomponent may be based on the content of at least one element among Y, Dy, Ho, Er, Gd, Ce, Nd, Sm, Nb, Tb, Eu, Tm, La, Lu, and Yb, regardless of type of addition such as oxide or carbonate.

The first subcomponent serves to prevent a decrease in reliability of a multilayer ceramic electronic component to which the dielectric material is applied in the exemplary embodiment in the present disclosure. When the first subcomponent is outside of the aforementioned range, high-temperature withstand voltage characteristics may deteriorate.

c) Second Subcomponent

According to an exemplary embodiment in the present disclosure, the dielectric material according to the present disclosure may include a second subcomponent including Si and/or Al. The Si element may be introduced in the form of carbonate, oxide and/or glass of the Si element in a raw material stage, but may be included in the dielectric layer in the form of an oxide and/or glass after sintering is performed. The Si component is mainly distributed at grain boundaries and has a high work function, thereby increasing resistance of the grain boundaries. Thereby, a multilayer ceramic electronic component having excellent reliability may be realized.

The second subcomponent may be included in a range of 0.5 parts by mole or more and 5.0 parts by mole or less with respect to the total 100 moles of the B site elements of the main component. The content of the second subcomponent may be based on the content of the Si element contained in the second subcomponent, regardless of type of an addition such as glass, oxide, or carbonate.

If the content of the second subcomponent is less than 0.5 parts by mole with respect to the total 100 moles of the B site elements of the main component, a dielectric constant and a high temperature withstand voltage may be lowered, and if the content of the second subcomponent exceeds 5.0 parts by mole, sinterability and density may decrease and a secondary phase may occur.

d) Third Subcomponent

According to an exemplary embodiment in the present disclosure, the dielectric material according to the present disclosure may include a third subcomponent including Ba and/or Ca.

The third subcomponent may be included in a range of 0.5 parts by mole or more and 3.0 parts by mole or less with respect to the total 100 moles of the B site elements of the main component. A lower limit of the third subcomponent may be, for example, 0 parts by mole or more or more than 0 parts by mole with respect to 100 parts by mole of the main component. The content of the third subcomponent may be based on the content of at least one element among Ba and Ca contained in the third subcomponent, regardless of type of an addition such as oxide or carbonate.

A crystal structure of the dielectric material according to the present disclosure may be controlled by including the third subcomponent in an amount of 5.0 parts by mole or less with respect to the total 100 moles of the B-site elements as the main component.

e) Fourth Subcomponent

According to an exemplary embodiment in the present disclosure, the dielectric material according to the present disclosure may include a fourth subcomponent including Mg.

The fourth subcomponent may function as a fixed-valence acceptor element, and may be included in a range of 0.25 parts by mole or more and 1.0 parts by mole or less with respect to 100 moles of the total B site elements of the main component. The content of the fourth subcomponent may be based on the content of the Mg element included in the fourth subcomponent, regardless of type of an addition such as oxide or carbonate.

If the content of the fourth subcomponent exceeds 1.0 part by mole with respect to the total 100 moles of the B-site elements of the main component, a problem of lowering a dielectric constant and lowering a high-temperature withstand voltage characteristic may occur.

In an example, the ratio $M_4/M_3$ (e.g., a mole ratio) of the content $M_4$ of the fourth subcomponent to the content $M_3$ of the third subcomponent may satisfy a range of 0.125 or more and 0.500 or less. By making the ratio of the third subcomponent and the fourth subcomponent satisfy the above range, abnormal grain growth of the dielectric material may be suppressed and even grains may be formed.

f) Fifth Subcomponent

According to an exemplary embodiment in the present disclosure, the dielectric material according to the present disclosure may include a fifth subcomponent including at least one of Mn, V, Cr, Fe, Ni, Co, Cu, and Zn.

The fifth subcomponent may function as a variable-valence acceptor element and may be included in a range of 0.1 parts by mole or more and 1.0 part by mole or less with respect to the total 100 moles of the B-site elements of the main component. The content of the fifth subcomponent may be based on the content of at least one element among Mn, V, Cr, Fe, Ni, Co, Cu, and Zn contained in the fifth subcomponent, regardless of type of an addition such as oxide or carbonate. For example, when 0.1 parts by mole of $V_2O_5$, an oxide of V contained in the fifth subcomponent, is included, the total amount of V may be 0.2 parts by mole.

The fifth subcomponent serves to improve reduction resistance of the dielectric magnetic composition and improve high temperature withstand voltage characteristics of a multilayer ceramic electronic component to which the dielectric material is applied.

Figure 4:
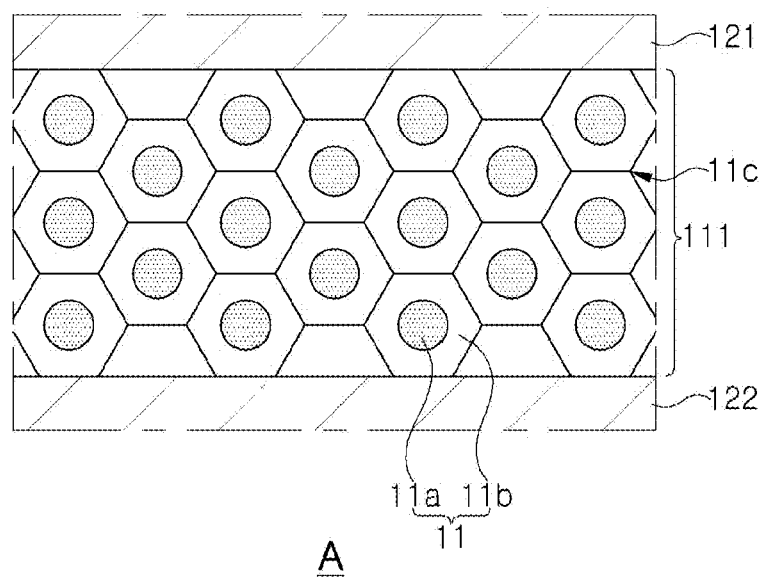
FIG. 4 is an enlarged view of region A of FIG. 3.

In an example, the dielectric material of the present disclosure may include a plurality of grains including the aforementioned main component and grain boundaries disposed between two or more grains. FIG. 4 is a schematic diagram illustrating a microstructure of a dielectric material according to an exemplary embodiment in the present disclosure. The dielectric material according to the present disclosure may be formed by sintering the aforementioned main component and subcomponents, and a dielectric material 111 formed by sintering the main component and subcomponents may include grains 11 and grain boundaries 11*c*.

Figure 5:
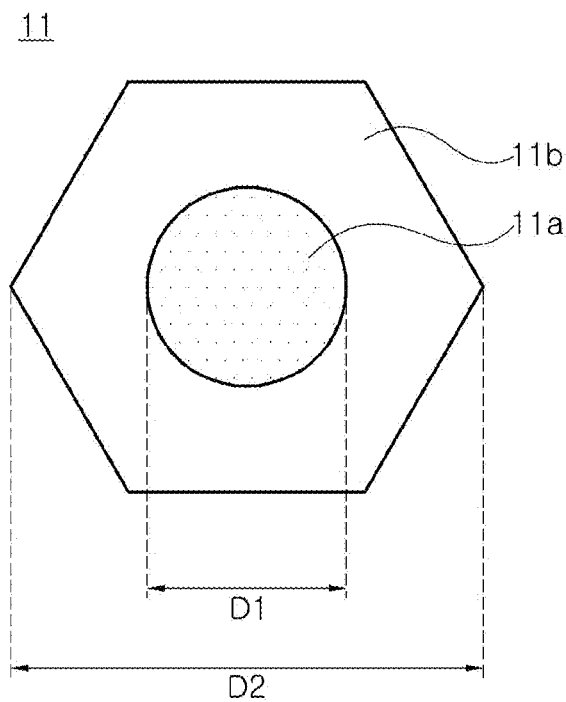
FIG. 5 is a diagram schematically illustrating grains of FIG. 4.

The grain may include a core portion and a shell portion, and the shell portion may be disposed to surround the core portion. In this case, an average diameter D1 of the core portion may be 5 nm or more and 100 nm or less, and an average diameter D2 of the grain may be 50 nm or more and 600 nm or less. FIG. 5 is a diagram schematically illustrating the grain. Referring to FIG. 5, the grain may have a core portion 11*a* disposed inside the shell portion 11*b*. The core portion 11*a* may refer to a region in which a subcomponent is not dissolved, and the shell portion 11*b* may refer to a region other than the core portion. The core portion and the shell portion may be distinguished from each other by analyzing a TEM-EDS image of a cut surface.

The average diameter D1 of the core portion and the average diameter D2 of the grain may be measured by image-scanning on a cross-section taken in the length-thickness (L-T) direction of the body 110 through a transmission electron microscope (TEM) (magnified 10,000 times). The core portion and the shell portion may be distinguished from each other by analyzing a TEM-EDS image. The core portion has a different color from the shell portion in the TEM-EDS image. After selecting 10 grains including the core portion and the shell portion, an average value of values obtained by measuring the maximum diameter of each grain may be D2, an average value of values obtained by measuring the maximum diameter of the core portion in each grain may be D1.

In another exemplary y embodiment in the present disclosure, the dielectric material according to the present disclosure may include a plurality of grains having a surface coated with a main component represented by $(Ba_{1-x}Ca_x)(Ti_{1-y}(Zr, Sn, Hf)_y)O_3$ ($0 \leq x \leq 1$, $0 \leq y \leq 0.5$) and a second subcomponent including Si and/or Al, and a grain boundary disposed between two or more grains, and here, an average diameter D1 of a core portion of the grain may be 5 nm or more and 100 nm or less, and an average diameter D2 of the entire grain may be 50 nm or more and 600 nm or less.

Figure 6:
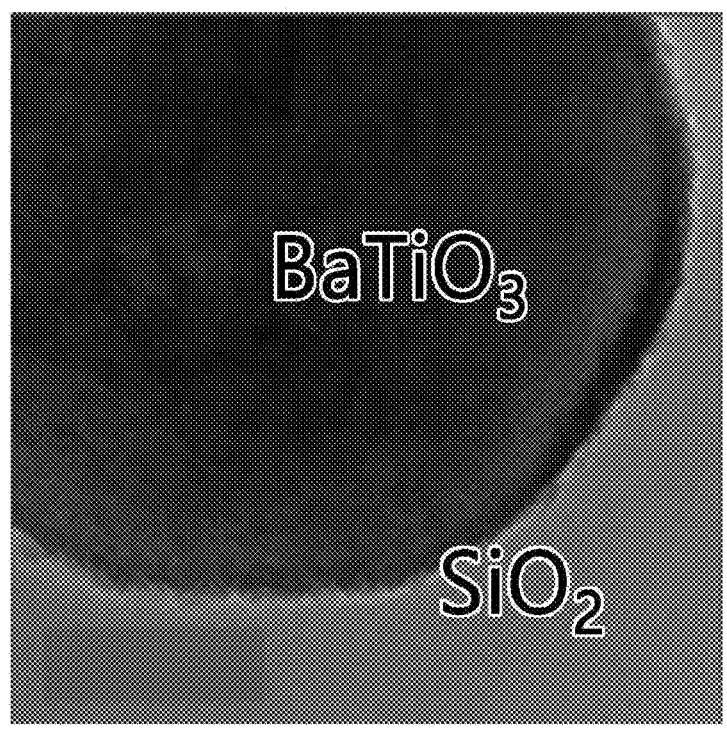
FIG. 6 is an SEM image of a main component according to an exemplary embodiment in the present disclosure.

FIG. 6 is an SEM image of a barium titanate ($BaTiO_3$) particle with $SiO_2$ applied on a surface thereof. Referring to FIG. 6, it can be seen that Si can be evenly applied to a surface of a main component by attaching Si to the surface of the base material in the step of preparing the main component and performing a heat treatment. When a dielectric material is formed using the main component coated with Si evenly on the surface thereof, the surface of the grain may be coated with Si, resistance improvement of the grain boundary may be maximized by evenly distributing Si to the region of the grain boundary after sintering.

The present disclosure also relates to a multilayer ceramic electronic component.

Figure 2:
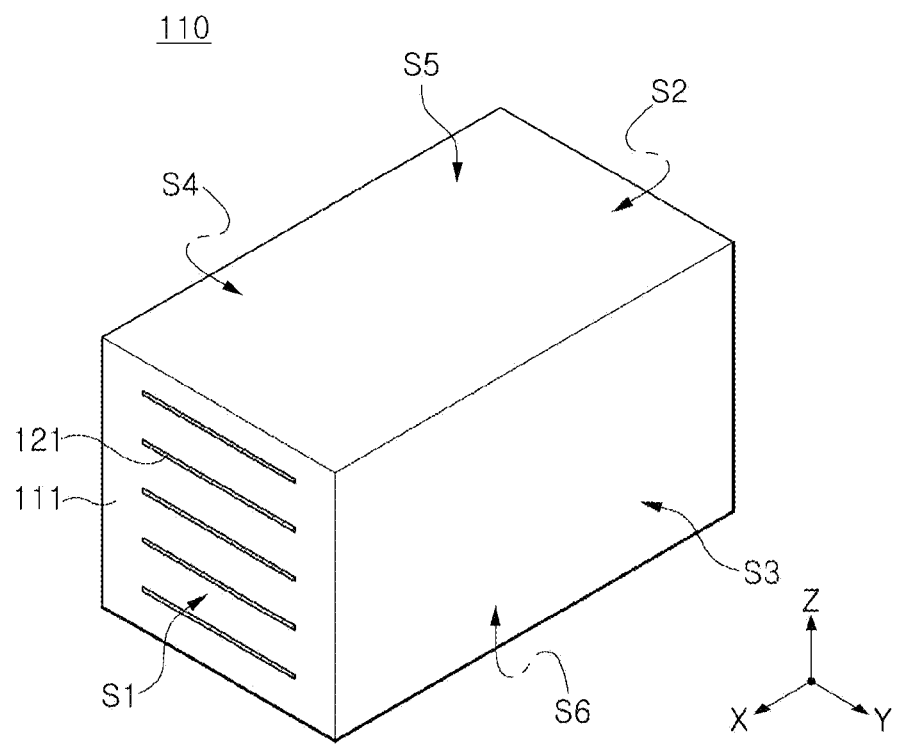
FIG. 2 is a perspective view schematically illustrating a ceramic body of FIG. 1.
Figure 3:
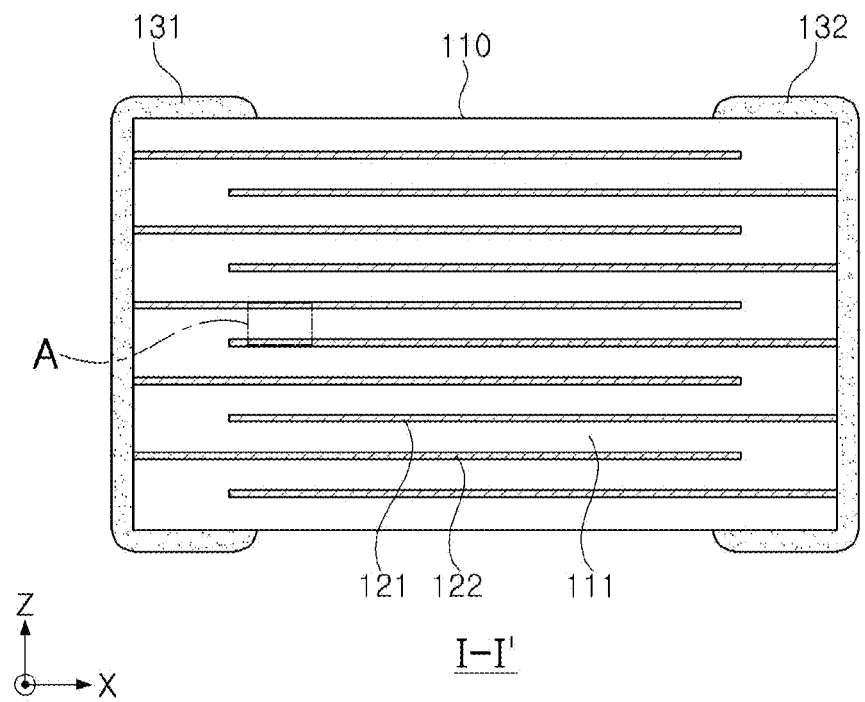
FIG. 3 is a cross-sectional view taken along line I-I' of FIG. 1.

FIG. 1 is a schematic perspective view illustrating a multilayer ceramic electronic component according to an exemplary embodiment in the present disclosure, FIG. 2 is a perspective view illustrating a ceramic body of FIG. 1, FIG. 3 is a cross-sectional view taken along line I-I' of FIG. 1, and FIG. 4 is an enlarged view of a region A of FIG. 3.

Referring to FIGS. 1 to 4, a multilayer ceramic electronic component 100 according to an exemplary embodiment in the present disclosure may include a ceramic body 110 including a dielectric layer 111, a first internal electrode 121, and a second internal electrode 122. The multilayer ceramic electronic component 100 according to an exemplary embodiment in the present disclosure may include a first external electrode 131 connected to the first internal electrode 121 and a second external electrode 132 connected to the second internal electrode 122 on an external surface of the ceramic body 110.

Here, the dielectric material may include: a main component (or main ingredient) represented by $(Ba_{1-x}Ca_x)(Ti_{1-y}(Zr, Sn, Hf)_y)O_3$ ($0 \leq x \leq 1$ and $0 \leq y \leq 0.5$); a first subcomponent (or first accessory ingredient) including at least one of elements among Y, Dy, Ho, Er, Gd, Ce, Nd, Sm, Nb, Tb, Eu, Tm, La, Lu, and Yb; a second subcomponent including Si and/or Al; and a third subcomponent including Ba and/or Ca, and at least two of the relational expressions 1 to 6 below may be satisfied.

$0.162 \leq M_{Tb}/M_{Dy} \leq 1.20$ [Relational Expression 1]

$0.176 \leq M_{Gd}/M_{Dy} \leq 0.60$ [Relational Expression 2]

$0.081 \leq M_{Sm}/M_{Dy} \leq 0.176$ [Relational Expression 3]

$0.081 \leq M_{Nb}/M_{Dy} \leq 0.176$ [Relational Expression 4]

$0.60 \leq M_2/M_1 \leq 1.36$ [Relational Expression 5]

$0.263 \leq M_3/M_2 \leq 0.455$ [Relational Expression 6]

In Relational Expressions 1 to 4, $M_{Tb}$, $M_{Dy}$, $M_{Gd}$, $M_{Sm}$ and $M_{Nb}$ is the number of moles of each component of the first subcomponent with respect to 100 moles which is the sum of B site elements of the main component, and in Relational Expressions 5 and 6, $M_1$ is a total number of moles of the first subcomponent with respect to 100 moles of Ti of the main component, $M_2$ is a total number of moles of the second subcomponent with respect to 100 moles of Ti of the main component, and $M_3$ is a total number of moles of the third subcomponent with respect to 100 moles which is the sum of the B site elements of the main component.

There is no particular limitation on a specific shape of the ceramic body 110, but as illustrated, the ceramic body 110 may have a hexahedral shape or a similar shape. Due to the shrinkage of ceramic powder particles included in the ceramic body 110 during sintering, the ceramic body 110 may not have a hexahedral shape with perfectly straight lines but may have a substantially hexahedral shape.

The ceramic body 110 may be formed by alternately stacking a ceramic green sheet on which the first internal electrode 121 is printed on the dielectric layer 111 and a ceramic green sheet on which the second internal electrode 122 is printed on the dielectric layer 111 in the thickness direction (Z direction).

In the ceramic body 110, the dielectric layer 111 and the internal electrodes 121 and 122 may be alternately stacked in the third direction. A plurality of dielectric layers 111 forming the ceramic body 110 are in a sintered state, and adjacent dielectric layers 111 may be integrated such that boundaries therebetween may not be readily apparent without using a scanning electron microscope (SEM).

According to an exemplary embodiment in the present disclosure, the dielectric layer 111 may have a layered structure of the aforementioned dielectric material and may include a main component represented by $(Ba_{1-x}Ca_x)(Ti_{1-y}(Zr, Sn, Hf)_y)O_3$ ($0 \leq x \leq 1$, $0 \leq y \leq 0.5$) and a subcomponent. In addition, various ceramic additives, organic solvents, plasticizers, binders, dispersants, and the like may be added to the material for forming the dielectric layer 111 according to the purpose of the present disclosure in addition to the aforementioned main and subcomponents of the dielectric material.

The dielectric layer 111 is formed by adding an additive as necessary to a slurry including the aforementioned main and subcomponents, applying the resultant slurry on a carrier film and drying the same to prepare a plurality of ceramic sheets. The ceramic sheet may be formed by manufacturing the slurry in a sheet shape having a thickness of several μm by a doctor blade method, but is not limited thereto.

In another exemplary embodiment in the present disclosure, the aforementioned Relational Expressions 1 to 4 may correspond to Relational Expressions 1-1 to 4-1 below, respectively.

$0.162 \leq (M_{Tb}/M_{Dy})/M_3 \leq 1.20$ [Relational Expression 1-1]

$0.176 \leq (M_{Gd}/M_{Dy})/M_3 \leq 0.60$ [Relational Expression 2-1]

$0.081 \leq (M_{Sm}/M_{Dy})/M_3 \leq 0.176$ [Relational Expression 3-1]

$0.081 \leq (M_{Nb}/M_{Dy})/M_3 \leq 0.176$ [Relational Expression 4-1]

In an exemplary embodiment in the present disclosure, the multilayer ceramic electronic component according to the present disclosure may further include a fourth subcomponent including Mg, and the ratio of the content $M_4$ of the fourth subcomponent to the content $M_3$ of the third subcomponent ($M_4/M_3$) may satisfy a range of 0.125 or more and 0.500 or less.

In another exemplary embodiment in the present disclosure, the multilayer ceramic electronic component according to the present disclosure may include a plurality of grains including the aforementioned main component and a grain boundary disposed between two or more grains, and an average diameter D1 of a core portion of the grain may be 5 nm or more and 100 nm or less, and an average diameter D2 of the entire grain may be 50 nm or more and 600 nm or less.

The dielectric layer may include the aforementioned main component and first to fifth subcomponents. The contents of the main component, subcomponent, relational expressions, and average diameters are the same as those described above, and thus will be omitted.

The first and second internal electrodes 121 and 122 may be stacked such that end surfaces thereof are exposed to opposing ends of the ceramic body 110, respectively. A material for forming the first and second internal electrodes 121 and 122 is not particularly limited, and for example, the first and second internal electrodes 121 and 122 may be formed using a conductive paste including at least one material among silver (Ag), palladium (Pd), gold (Au), platinum (Pt), nickel (Ni), copper (Cu), tin (Sn), tungsten (W), titanium (Ti), and alloys thereof. A printing method of the conductive paste may be a screen printing method or a gravure printing method, but the present disclosure is not limited thereto.

In the multilayer ceramic electronic component according to an exemplary embodiment in the present disclosure, a first external electrode 131 and a second external electrode 132 may be disposed on an external surface of the ceramic body. The first external electrode 131 may be connected to the first internal electrode 121, and the second external electrode 132 may be connected to the second internal electrode 122.

The first external electrode 131 and the second external electrode 132 may include a conductive metal. The conductive metal may be at least one of copper (Cu), nickel (Ni), tin (Sn), palladium (Pd), platinum (Pt), gold (Au), silver (Ag), tungsten (W), titanium (Ti), and lead (Pb), and alloys thereof, but is not limited thereto.

Hereinafter, the present disclosure will be described in more detail through experimental examples, but this is to help understand the present disclosure and the scope of the present disclosure is not limited by the experimental examples.

Experimental Example $BaTiO_3$ powder particles having an average particle size of 30 nm to 100 nm were used as a raw material of the main component. The raw materials of the main and subcomponents corresponding to the compositions 1-1 to 5-3 specified in Table 1 below were mixed with ethanol/toluene and a dispersant using zirconia balls as a mixing/dispersing media and milled mechanically for 10 hours. After a binder was mixed with the mixture, the mixture was milled for 10 hours.

Using the prepared slurry, green sheets having thicknesses of 0.8 μm and 10 μm were manufactured with an on-roll coater based on a head discharge method. Then, Ni internal electrodes were printed on the green sheets.

A plurality of layers of the green sheets were stacked, and ceramic sheets for margin regions were attached to both sides of a cover sheet and a chip to produce a compressed bar. A green chip having a 0603 size (width×length×height: 0.6 mm×0.3 mm×0.3 mm) was manufactured by cutting the compressed bar using a cutter.

The completed prototype chip having the 0603 size was burned out at about 900° C., sintered at a reducing atmosphere of 0.1% $H_2$/99.9% $N_2$ to 1.0% $H_2$/99.0% $N_2$ ($H_2O/H_2/N_2$ atmosphere) at a temperature of about 1200° C. for a maintaining time within a range of 10 minutes to 1 hour, and subsequently heat-treated for re-oxidation at 950° C. for three hours under an $N_2$ atmosphere.

Electrical properties of the manufactured prototype chip were measured, and density, uniformity of a microstructure, occurrence of a secondary phase, and the like were comprehensively checked. The content of the following samples was measured through an Inductively coupled plasma (ICP) analysis, and the ICP analysis was performed using an inductively coupled plasma emission spectrometer (ICP-OES; Optima 7300DV, PerkinElmer). In addition, the presence or absence of each element and a relative ratio between the elements were measured using TEM and STEM mapping equipment such as Tiatan cubed G2 60-300 manufactured by FEI.

TABLE 1

| | Number of subcomponent moles per Ti 100 moles of main component | | | | | | | | | |
|---|---|---|---|---|---|---|---|---|---|---|
| | First subcomponent | | | | | Second subcomponent | | Third subcomponent | Major subcomponents ratio | |
| Sample | Tb | Gd | Sm | Nb | Dy | Si | Coated Si | Ba | $M_{RE}/M_{Dy}$ | $M_2/M_1$ |
| 1 | 0 | 0 | 0 | 0 | 4 | 3.3 | 0 | 1.5 | 0 | 0.825 |
| 2 | 0.6 | 0 | 0 | 0 | 3.7 | 3.3 | 0 | 1.5 | 0.1621622 | 0.7674419 |
| 3 | 1.2 | 0 | 0 | 0 | 3.4 | 3.3 | 0 | 1.5 | 0.3529412 | 0.7173913 |
| 4 | 1.8 | 0 | 0 | 0 | 3.1 | 3.3 | 0 | 1.5 | 0.5806452 | 0.6734694 |
| 5 | 2.4 | 0 | 0 | 0 | 2.8 | 3.3 | 0 | 1.5 | 0.8571429 | 0.6346154 |
| 6 | 3 | 0 | 0 | 0 | 2.5 | 3.3 | 0 | 1.5 | 1.2 | 0.6 |
| 7 | 3.6 | 0 | 0 | 0 | 2.2 | 3.3 | 0 | 1.5 | 1.6363636 | 0.5689655 |
| 8 | 4.2 | 0 | 0 | 0 | 1.9 | 3.3 | 0 | 1.5 | 2.2105263 | 0.5409836 |
| 9 | 0 | 0.3 | 0 | 0 | 3.7 | 3.3 | 0 | 1.5 | 0.0810811 | 0.825 |
| 10 | 0 | 0.6 | 0 | 0 | 3.4 | 3.3 | 0 | 1.5 | 0.1764706 | 0.825 |
| 11 | 0 | 0.9 | 0 | 0 | 3.1 | 3.3 | 0 | 1.5 | 0.2903226 | 0.825 |
| 12 | 0 | 1.2 | 0 | 0 | 2.8 | 3.3 | 0 | 1.5 | 0.4285714 | 0.825 |
| 13 | 0 | 1.5 | 0 | 0 | 2.5 | 3.3 | 0 | 1.5 | 0.6 | 0.825 |
| 14 | 0 | 1.8 | 0 | 0 | 2.2 | 3.3 | 0 | 1.5 | 0.8181818 | 0.825 |
| 15 | 0 | 2.1 | 0 | 0 | 1.9 | 3.3 | 0 | 1.5 | 1.1052632 | 0.825 |
| 16 | 0 | 0 | 0.3 | 0 | 3.7 | 3.3 | 0 | 1.5 | 0.0810811 | 0.825 |
| 17 | 0 | 0 | 0.6 | 0 | 3.4 | 3.3 | 0 | 1.5 | 0.1764706 | 0.825 |

TABLE 1-continued

| | Number of subcomponent moles per Ti 100 moles of main component | | | | | | | | Major subcomponents ratio | |
|---|---|---|---|---|---|---|---|---|---|---|
| | First subcomponent | | | | | Second subcomponent | | Third subcomponent | | |
| Sample | Tb | Gd | Sm | Nb | Dy | Si | Coated Si | Ba | $M_{RE}/M_{Dy}$ | $M_2/M_1$ |
| 18 | 0 | 0 | 0.9 | 0 | 3.1 | 3.3 | 0 | 1.5 | 0.2903226 | 0.825 |
| 19 | 0 | 0 | 1.2 | 0 | 2.8 | 3.3 | 0 | 1.5 | 0.4285714 | 0.825 |
| 20 | 0 | 0 | 1.5 | 0 | 2.5 | 3.3 | 0 | 1.5 | 0.6 | 0.825 |
| 21 | 0 | 0 | 1.8 | 0 | 2.2 | 3.3 | 0 | 1.5 | 0.8181818 | 0.825 |
| 22 | 0 | 0 | 2.1 | 0 | 1.9 | 3.3 | 0 | 1.5 | 1.1052632 | 0.825 |
| 23 | 0 | 0 | 0 | 0.3 | 3.7 | 3.3 | 0 | 1.5 | 0.0810811 | 0.825 |
| 24 | 0 | 0 | 0 | 0.6 | 3.4 | 3.3 | 0 | 1.5 | 0.1764706 | 0.825 |
| 25 | 0 | 0 | 0 | 0.9 | 3.1 | 3.3 | 0 | 1.5 | 0.2903226 | 0.825 |
| 26 | 0 | 0 | 0 | 1.2 | 2.8 | 3.3 | 0 | 1.5 | 0.4285714 | 0.825 |
| 27 | 0 | 0 | 0 | 1.5 | 2.5 | 3.3 | 0 | 1.5 | 0.6 | 0.825 |
| 28 | 0 | 0 | 0 | 1.8 | 2.2 | 3.3 | 0 | 1.5 | 0.8181818 | 0.825 |
| 29 | 0 | 0 | 0 | 2.1 | 1.9 | 3.3 | 0 | 1.5 | 1.1052632 | 0.825 |
| 30 | 0.6 | 0 | 0 | 0 | 3.7 | 2.5 | 0 | 1.5 | 0.1621622 | 0.5813953 |
| 31 | 1.2 | 0 | 0 | 0 | 3.4 | 2.5 | 0 | 1.5 | 0.3529412 | 0.5434783 |
| 32 | 1.8 | 0 | 0 | 0 | 3.1 | 2.5 | 0 | 1.5 | 0.5806452 | 0.5102041 |
| 33 | 2.4 | 0 | 0 | 0 | 2.8 | 2.5 | 0 | 1.5 | 0.8571429 | 0.4807692 |
| 34 | 3 | 0 | 0 | 0 | 2.5 | 2.5 | 0 | 1.5 | 1.2 | 0.4545455 |
| 35 | 0.6 | 0 | 0 | 0 | 3.7 | 4.1 | 0 | 1.5 | 0.1621622 | 0.9534884 |
| 36 | 1.2 | 0 | 0 | 0 | 3.4 | 4.1 | 0 | 1.5 | 0.3529412 | 0.8913043 |
| 37 | 1.8 | 0 | 0 | 0 | 3.1 | 4.1 | 0 | 1.5 | 0.5806452 | 0.8367347 |
| 38 | 2.4 | 0 | 0 | 0 | 2.8 | 4.1 | 0 | 1.5 | 0.8571429 | 0.7884615 |
| 39 | 3 | 0 | 0 | 0 | 2.5 | 4.1 | 0 | 1.5 | 1.2 | 0.7454545 |
| 40 | 0.6 | 0 | 0 | 0 | 3.7 | 5.7 | 0 | 1.5 | 0.1621622 | 1.3255814 |
| 41 | 1.2 | 0 | 0 | 0 | 3.4 | 5.7 | 0 | 1.5 | 0.3529412 | 1.2391304 |
| 42 | 1.8 | 0 | 0 | 0 | 3.1 | 5.7 | 0 | 1.5 | 0.5806452 | 1.1632653 |
| 43 | 2.4 | 0 | 0 | 0 | 2.8 | 5.7 | 0 | 1.5 | 0.8571429 | 1.0961538 |
| 44 | 3 | 0 | 0 | 0 | 2.5 | 5.7 | 0 | 1.5 | 1.2 | 1.0363636 |
| 45 | 0.6 | 0 | 0 | 0 | 3.7 | 6.5 | 0 | 1.5 | 0.1621622 | 1.5116279 |
| 46 | 1.2 | 0 | 0 | 0 | 3.4 | 6.5 | 0 | 1.5 | 0.3519412 | 1.4130435 |
| 47 | 1.8 | 0 | 0 | 0 | 3.1 | 6.5 | 0 | 1.5 | 0.5806452 | 1.3265306 |
| 48 | 2.4 | 0 | 0 | 0 | 2.8 | 6.5 | 0 | 1.5 | 0.8571429 | 1.25 |
| 49 | 3 | 0 | 0 | 0 | 2.5 | 6.5 | 0 | 1.5 | 1.2 | 1.1818182 |
| 50 | 0.6 | 0 | 0 | 0 | 3.7 | 0 | 4.1 | 1.5 | 0.1621622 | 0.9534884 |
| 51 | 1.2 | 0 | 0 | 0 | 3.4 | 0 | 4.1 | 1.5 | 0.3529412 | 0.8913043 |
| 52 | 1.8 | 0 | 0 | 0 | 3.1 | 0 | 4.1 | 1.5 | 0.5806452 | 0.8367347 |
| 53 | 2.4 | 0 | 0 | 0 | 2.8 | 0 | 4.1 | 1.5 | 0.8571429 | 0.7884615 |
| 54 | 3 | 0 | 0 | 0 | 2.5 | 0 | 4.1 | 1.5 | 1.2 | 0.7454545 |

In Table 1, $M_{RE}$ is the number of moles of the first subcomponent excluding Dy, $M_{Dy}$ is the number of moles of Dy, $M_1$ is a total number of moles of the first subcomponents and coated Si represents a case of ionizing an $SiO_2$ oxide and uniformly applying the ionized $SiO$, oxide to a surface of the $BaTiO_3$.

TABLE 2

| | Ratio of major subcomponents | | | | Structural characteristics | | | Electrical characteristics | | |
|---|---|---|---|---|---|---|---|---|---|---|
| | | | | | Microstructure | Secondary | | Dielectric | Withstand | High temperature |
| No. | $M_{RE}/M_{Dy}$ | $(M_{RE}/M_{Dy})/M_3$ | $M_2/M_1$ | $M_3/M_2$ | Density | uniformity | phase control | constant | voltage | reliability |
| 1 | 0 | 0 | 0.825 | 0.455 | Δ | Δ | X | ○ | Δ | Δ |
| 2 | 0.162162 | 0.108108 | 0.767442 | 0.455 | ○ | ○ | ○ | ○ | ○ | ○ |
| 3 | 0.352941 | 0.235294 | 0.717391 | 0.455 | ○ | ○ | ○ | ○ | ○ | ◎ |
| 4 | 0.580645 | 0.387097 | 0.673469 | 0.455 | ○ | ○ | ○ | ○ | ○ | ◎ |
| 5 | 0.857143 | 0.571429 | 0.634615 | 0.455 | ○ | ○ | ○ | ○ | ○ | ◎ |
| 6 | 1.2 | 0.8 | 0.6 | 0.455 | ○ | ○ | ○ | ○ | ○ | ◎ |
| 7 | 1.636364 | 1.090909 | 0.568966 | 0.455 | ◎ | ◎ | ◎ | ◎ | Δ | Δ |
| 8 | 2.210526 | 1.473684 | 0.540984 | 0.455 | ◎ | ◎ | ◎ | ◎ | X | X |
| 9 | 0.081081 | 0.054054 | 0.825 | 0.455 | ○ | ○ | ○ | ○ | Δ | Δ |
| 10 | 0.176471 | 0.117647 | 0.825 | 0.455 | ○ | ○ | ○ | ○ | ○ | ○ |
| 11 | 0.290323 | 0.193548 | 0.825 | 0.455 | ○ | ○ | ○ | ○ | ○ | ○ |
| 12 | 0.428571 | 0.285714 | 0.825 | 0.455 | ○ | ○ | ○ | ○ | ○ | ○ |
| 13 | 0.6 | 0.4 | 0.825 | 0.455 | ○ | ○ | ○ | ○ | ○ | ○ |
| 14 | 0.818182 | 0.545455 | 0.825 | 0.455 | ○ | ○ | ○ | ○ | Δ | Δ |
| 15 | 1.105263 | 0.736842 | 0.825 | 0.455 | ◎ | ◎ | ◎ | ◎ | X | X |
| 16 | 0.081081 | 0.054054 | 0.825 | 0.455 | ○ | ○ | ○ | ○ | ○ | ○ |
| 17 | 0.176471 | 0.117647 | 0.825 | 0.455 | ○ | ○ | ○ | ○ | ○ | ○ |
| 18 | 0.290323 | 0.193548 | 0.825 | 0.455 | ○ | ○ | ○ | ◎ | Δ | Δ |

TABLE 2-continued

| | Ratio of major subcomponents | | | | Structural characteristics | | | Electrical characteristics | | |
|---|---|---|---|---|---|---|---|---|---|---|
| | | | | | | Microstructure | Secondary | Dielectric | Withstand | High temperature |
| No. | $M_{RE}/M_{Dy}$ | $(M_{RE}/M_{Dy})/M_3$ | $M_2/M_1$ | $M_3/M_2$ | Density | uniformity | phase control | constant | voltage | reliability |
| 19 | 0.428571 | 0.285714 | 0.825 | 0.455 | ○ | ○ | ○ | ◎ | Δ | Δ |
| 20 | 0.6 | 0.4 | 0.825 | 0.455 | ○ | ○ | ○ | ◎ | X | X |
| 21 | 0.818182 | 0.545455 | 0.825 | 0.455 | ○ | ○ | ○ | ◎ | X | X |
| 22 | 1.105263 | 0.736842 | 0.825 | 0.455 | ◎ | ◎ | ◎ | ◎ | X | X |
| 23 | 0.081081 | 0.054054 | 0.825 | 0.455 | ○ | ○ | ○ | ○ | ○ | ○ |
| 24 | 0.176471 | 0.117647 | 0.825 | 0.455 | ○ | ○ | ○ | ◎ | ○ | ○ |
| 25 | 0.290323 | 0.193548 | 0.825 | 0.455 | ○ | ○ | ○ | ◎ | Δ | Δ |
| 26 | 0.428571 | 0.285714 | 0.825 | 0.455 | ○ | ○ | ○ | ○ | X | X |
| 27 | 0.6 | 0.4 | 0.825 | 0.455 | ○ | ○ | ○ | Δ | X | X |
| 28 | 0.818182 | 0.545455 | 0.825 | 0.455 | ○ | ○ | ○ | Δ | X | X |
| 29 | 1.105263 | 0.736842 | 0.825 | 0.455 | ◎ | ◎ | ◎ | X | X | X |
| 30 | 0.162162 | 0.108108 | 0.581395 | 0.6 | Δ | Δ | ○ | ○ | Δ | Δ |
| 31 | 0.352941 | 0.235294 | 0.543478 | 0.6 | Δ | Δ | ○ | ○ | Δ | ○ |
| 32 | 0.580645 | 0.387097 | 0.510204 | 0.6 | Δ | ○ | ○ | ○ | ○ | ◎ |
| 33 | 0.857143 | 0.571429 | 0.480769 | 0.6 | Δ | ○ | ○ | ○ | ○ | ◎ |
| 34 | 1.2 | 0.8 | 0.454545 | 0.6 | Δ | ○ | ○ | ○ | ○ | ○ |
| 35 | 0.162162 | 0.108108 | 0.953488 | 0.366 | ○ | ○ | ○ | ○ | ◎ | ○ |
| 36 | 0.352941 | 0.235294 | 0.891304 | 0.366 | ○ | ○ | ○ | ○ | ◎ | ○ |
| 37 | 0.580645 | 0.387097 | 0.836735 | 0.366 | ○ | ○ | ○ | ○ | ◎ | ◎ |
| 38 | 0.857143 | 0.571429 | 0.788462 | 0.366 | ○ | ○ | ○ | ○ | ◎ | ◎ |
| 39 | 1.2 | 0.8 | 0.745455 | 0.366 | ○ | ○ | ○ | ○ | ◎ | ○ |
| 40 | 0.162162 | 0.108108 | 1.325581 | 0.263 | Δ | ○ | Δ | X | ◎ | ◎ |
| 41 | 0.352941 | 0.235294 | 1.23913 | 0.263 | ○ | ○ | ○ | Δ | ◎ | ◎ |
| 42 | 0.580645 | 0.387097 | 1.163265 | 0.263 | ○ | ○ | ○ | ○ | ◎ | ◎ |
| 43 | 0.857143 | 0.571429 | 1.096154 | 0.263 | ○ | ○ | ○ | ○ | ◎ | ◎ |
| 44 | 1.2 | 0.8 | 1.036364 | 0.263 | ○ | ○ | ○ | ○ | ◎ | ◎ |
| 45 | 0.162162 | 0.108108 | 1.511628 | 0.231 | Δ | ○ | Δ | X | Δ | Δ |
| 46 | 0.352941 | 0.235294 | 1.413043 | 0.231 | ○ | ○ | ○ | X | ◎ | ◎ |
| 47 | 0.580645 | 0.387097 | 1.326531 | 0.231 | ○ | ○ | ○ | Δ | ◎ | ◎ |
| 48 | 0.857143 | 0.571429 | 1.25 | 0.231 | ○ | ○ | ○ | Δ | ◎ | ◎ |
| 49 | 1.2 | 0.8 | 1.181818 | 0.231 | ○ | ○ | ○ | Δ | ◎ | ◎ |
| 50 | 0.162162 | 0.108108 | 0.953488 | 0.366 | ○ | ○ | ○ | ○ | ◎ | ◎ |
| 51 | 0.352941 | 0.235294 | 0.891304 | 0.366 | ○ | ○ | ○ | ○ | ◎ | ◎ |
| 52 | 0.580645 | 0.387097 | 0.836735 | 0.366 | ○ | ○ | ○ | ○ | ◎ | ◎ |
| 53 | 0.857143 | 0.571429 | 0.788462 | 0.366 | ○ | ○ | ○ | ○ | ◎ | ◎ |
| 54 | 1.2 | 0.8 | 0.745455 | 0.366 | ○ | ○ | ○ | ○ | ◎ | ○ |

Table 2 illustrates the characteristics of the prototype chip corresponding to the samples of the numbers specified in Table 1. In Table 2, $M_2$ is the total number of moles of the second subcomponent, and $M_3$ is the total number of moles of the third subcomponent.

In Tables 1 and 2, for a dielectric constant, capacitance was measured under the conditions of 1 kHz and AC 0.5 V/μm using an LCR meter. A dielectric constant of the dielectric material of the prototype chip was calculated from the capacitance, a thickness of the dielectric material of the prototype chip, an area of internal electrodes, and the number of stacks. As a result of the calculation, a case in which the dielectric constant was less than 1500 was defined as x, a case of 1500 or more and less than 2000 was defined as Δ, a case of 2000 or more and less than 3000 was defined as ○, and a case of 3000 or more was defined as ◎.

The withstand voltage characteristics of certain 10 samples of the manufactured prototype chip were selected and post-measured, while increasing an applied voltage in a state in which a DC 10 V/μm was applied. A case in which a threshold voltage value at which insulation breakdown occurs is less than 20 V was defined as x, a case of 20 V or more and less than 30 V was defined as Δ, a case of 30 V or more and less than 40 V was defined as ○, and a case of 40 V or more was defined as ◎.

High-temperature reliability was measured under conditions of applying DC 10 V/μm in a high-temperature environment at 105° C. using STEP-IR equipment, maintaining the state for 30 minutes, and subsequently increasing the voltage, and IR degradation life was measured. The criterion for high-temperature reliability was determined based on a lifetime during which IR degradation occurs, and a case in which a duration in which all 10 chips failed was less than 3 hours was defined as x, a case of 3 hours or more and less than 6 hours was defined as Δ, a case of 6 hours or more and less than 10 hours was defined as ○, and a case of 10 hours or more was defined as ◎.

For structural characteristics of the chip, differences in density and average grain size change for each portion observed by SEM in a fracture surface and a polished surface of the sintered chip were compared. As for density and the frequency of secondary phases, a case in which the number of pores and secondary phases observed per area in an image of 50 K magnification were 100 or more was defined as x, a case of less than 100 and 70 or more was defined as Δ, a case of less than 70 and 40 or more was defined as ○, and a case of less than 40 was defined as ◎.

As for microstructure uniformity, a case in which a standard deviation value (STDEV) relative to an overall average grain size had a value of 150 or more was defined as x, a case of less than 150 and 120 or more was defined as Δ, a case of less than 120 and 80 or more was defined as ○, and a case of less than 80 was defined as ◎.

Referring to Samples 1 to 8, it can be seen that, when Tb/Dy is less than 0.162, the dielectric constant is excellent but the structural characteristics, withstand voltage, and high temperature reliability are deteriorated. In addition, it can be seen that, when Tb/Dy exceeds 1.20, structural characteristics are excellent but electrical characteristics such as withstand voltage and high temperature reliability are deteriorated. Therefore, it can be seen that the content ratio of Tb/Dy should satisfy the range of 0.162 or more and 1.20 or less.

Referring to Samples 9 to 15, it can be seen that, when Gd/Dy is less than 0.176, the structural characteristics and dielectric constant are excellent but the withstand voltage and high temperature reliability are degraded. In addition, it can be seen that, when Gd/Dy exceeds 0.60, electrical characteristics such as withstand voltage and high temperature reliability are deteriorated. Therefore, it can be seen that the content ratio of Gd/Dy should satisfy the range of 0.176 or more and 0.60 or less.

Referring to Samples 16 to 22, it can be seen that, when Sm/Dy is less than 0.081, withstand voltage and high temperature reliability are very poor. In addition, it can be seen that, when Sm/Dy exceeds 0.176, an excellent dielectric constant is obtained but electrical characteristics such as withstand voltage and high temperature reliability are deteriorated. Therefore, it can be seen that the content ratio of Sm/Dy should satisfy the range of 0.081 or more and 0.176 or less.

Referring to Samples 23 to 29, it can be seen that, when Nb/Dy is less than 0.081, withstand voltage and high temperature reliability are very poor. In addition, it can be seen that, when Nb/Dy exceeds 0.176, an excellent dielectric constant is obtained but electrical characteristics such as withstand voltage and high temperature reliability are deteriorated. Therefore, it can be seen that the content ratio of Nb/Dy should satisfy the range of 0.081 or more and 0.176 or less.

Referring to Samples 30 to 49, it can be seen that, even if the same content of the first subcomponent is applied, dielectric constant and density are lowered if the content of the second subcomponent is added at a ratio outside the appropriate range, and it can be seen that, even if the same content of Si is applied, the dielectric constant is lowered when the content ratio with the third subcomponent is outside a predetermined range. Accordingly, it can be seen that, even if the first subcomponent corresponding to a rare earth element has the same content, the content ratio of the second subcomponent and the third subcomponent has a significant influence.

Samples 50 to 54 show the results of using the main component coated with Si on the surface thereof. Referring to Samples 50 to 54, it can be seen that, when Si is evenly distributed on the surface of the main component, excellent results of electrical properties are obtained even if the content of the first subcomponent is the same. That is, it can be seen that, interfacial resistance of the grain boundary may be more effectively improved when Si is controlled to be evenly distributed on the surface of the main component.

As set forth above, one of several effects according to the present disclosure provides a dielectric material and a multilayer ceramic electronic component having a high dielectric constant and excellent withstand voltage characteristics.

One of several effects according to the present disclosure provides a dielectric material and a multilayer ceramic electronic component having excellent high temperature withstand voltage.

One of the various effects of the present disclosure provides a dielectric material and a multilayer ceramic electronic component capable of controlling a secondary phase, while providing excellent dielectric density and uniformity of a microstructure.

While exemplary embodiments have been shown and described above, it will be apparent to those skilled in the art that modifications and variations could be made without departing from the scope of the present disclosure as defined by the appended claims.

What is claimed is:

1. A dielectric material comprising:
    a main component represented by $(Ba_{1-x}Ca_x)(Ti_{1-y}(Zr, Sn, Hf)_y)O_3$ ($0 \le x \le 1$ and $0 \le y \le 0.5$);
    a first subcomponent including at least one of elements among Y, Dy, Ho, Er, Gd, Ce, Nd, Sm, Nb, Tb, Eu, Tm, La, Lu, or Yb;
    a second subcomponent including Si and/or Al; and
    a third subcomponent including Ba and/or Ca,
    wherein at least two of the Relational Expressions 1, 2, 3 or 4 below are satisfied, and at least one of the Relational Expressions 5 or 6 below is satisfied:

$0.162 \le M_{Tb}/M_{Dy} \le 1.20$ [Relational Expression 1]

$0.176 \le M_{Gd}/M_{Dy} \le 0.60$ [Relational Expression 2]

$0.081 \le M_{Sm}/M_{Dy} \le 0.176$ [Relational Expression 3]

$0.081 \le M_{Nb}/M_{Dy} \le 0.176$ [Relational Expression 4]

$0.60 \le M_2/M_1 \le 1.36$ [Relational Expression 5]

$0.263 \le M_3/M_2 \le 0.455$, [Relational Expression 6], wherein, in Relational Expressions 1 to 4, $M_{Tb}$, $M_{Dy}$, $M_{Gd}$, $M_{Sm}$ and $M_{Nb}$ are the numbers of moles of Tb, Dy, Gd, Sm, and Nb of the first subcomponent with respect to 100 moles which is a sum of B site elements of the main component, respectively, and in Relational Expressions 5 and 6, $M_1$ is a total number of moles of the first subcomponent with respect to 100 moles of Ti of the main component, $M_2$ is a total number of moles of the second subcomponent with respect to 100 moles of Ti of the main component, and $M_3$ is a total number of moles of the third subcomponent with respect to 100 moles which is the sum of the B site elements of the main component.

2. The dielectric material of claim 1, wherein Relational Expressions 5 and 6 are satisfied.

3. The dielectric material of claim 1, wherein Relational Expressions 1 to 6 are satisfied.

4. The dielectric material of claim 1, wherein
    Relational Expressions 1 to 4 correspond to Relational Expressions 1-1 to 4-1, respectively, and
    when any one or more of Relational Expressions 1 to 4 is satisfied, a corresponding Relational Expression among Relational Expressions 1-1 to 4-1 is additionally satisfied:

$0.108 \le (M_{Tb}/M_{Dy})/M_3 \le 0.800$ [Relational Expression 1-1]

$0.118 \le (M_{Gd}/M_{Dy})/M_3 \le 0.400$ [Relational Expression 2-1]

$0.054 \le (M_{Sm}/M_{Dy})/M_3 \le 0.118$ [Relational Expression 3-1]

$0.054 \le (M_{Nb}/M_{Dy})/M_3 \le 0.118$ [Relational Expression 4-1].

5. The dielectric material of claim 1, wherein
    a content of the third subcomponent satisfies a range of 0.5 molar part or more and 3.0 molar parts or less with respect to 100 moles which is the sum of the B site elements of the main component.

6. The dielectric material of claim 1, further comprising: a fourth subcomponent including Mg,
   wherein a content of the fourth subcomponent satisfies a range of 0.25 molar part or more and 1.0 molar part or less with respect to 100 moles which is the sum of the B site elements of the main component.

7. The dielectric material of claim 6, wherein $M_4/M_3$ which is the ratio of a content $M_4$ of the fourth subcomponent to a content $M_3$ of the third subcomponent satisfies a range of 0.125 or more and 0.500 or less.

8. The dielectric material of claim 1, wherein
   a content of the first subcomponent satisfies a range of 0.3 molar part or more and 5.7 molar parts or less with respect to 100 moles which is the sum of the B site elements of the main component, and
   a content of the second subcomponent satisfies a range of 0.5 molar part or more and 6.5 molar parts or less with respect to 100 moles which is the sum of the B site elements of the main component.

9. The dielectric material of claim 1, further comprising:
   a fifth subcomponent including at least one of Mn, V, Cr, Fe, Ni, Co, Cu, or Zn, and
   a content of the fifth subcomponent satisfies a range of 0.1 molar part or more and 1.0 molar part or less with respect to 100 moles which is the sum of the B site elements.

10. The dielectric material of claim 1, further comprising grains including the main component and a grain boundary disposed between two or more grains, wherein an average diameter D1 of a core portion of the grains is 5 nm or more and 100 nm or less, and an average diameter D2 of the grains is 50 nm or more and 600 nm or less.

11. A multilayer ceramic electronic component comprising:
   a ceramic body including a dielectric layer and first and second internal electrodes; and
   first and second external electrodes disposed on an external surface of the ceramic body and connected to the first and second internal electrodes, respectively,
   wherein the dielectric layer includes: a main component represented by $(Ba_{1-x}Ca_x)(Ti_{1-y}(Zr, Sn, Hf)_y)O_3$ ($0 \leq x \leq 1$ and $0 \leq y \leq 0.5$); a first subcomponent including at least one of elements among Y, Dy, Ho, Er, Gd, Ce, Nd, Sm, Nb, Tb, Eu, Tm, La, Lu, or Yb; a second subcomponent including Si and/or Al; and a third subcomponent including Ba and/or Ca,
   wherein at least two of the Relational Expressions 1, 2, 3 or 4 below are satisfied, and at least one of the Relational Expressions 5 or 6 below is satisfied:

$0.162 \leq M_{Tb}/M_{Dy} \leq 1.20$     [Relational Expression 1]

$0.176 \leq M_{Gd}/M_{Dy} \leq 0.60$     [Relational Expression 2]

$0.081 \leq M_{Sm}/M_{Dy} \leq 0.176$     [Relational Expression 3]

$0.081 \leq M_{Nb}/M_{Dy} \leq 0.176$     [Relational Expression 4]

$0.60 \leq M_2/M_1 \leq 1.36$     [Relational Expression 5]

$0.263 \leq M_3/M_2 \leq 0.455$     [Relational Expression 6], wherein, in Relational Expressions 1 to 4,
   $M_{Tb}$, $M_{Dy}$, $M_{Gd}$, $M_{Sm}$ and $M_{Nb}$ are the numbers of moles of Tb, Dy, Gd, Sm, and Nb of the first subcomponent with respect to 100 moles which is a sum of B site elements of the main component, respectively and
   in Relational Expressions 5 and 6, $M_1$ is a total number of moles of the first subcomponent with respect to 100 moles of Ti of the main component, $M_2$ is a total number of moles of the second subcomponent with respect to 100 moles of Ti of the main component, and $M_3$ is a total number of moles of the third subcomponent with respect to 100 moles which is the sum of the B site elements of the main component.

12. The multilayer ceramic electronic component of claim 11, wherein Relational Expressions 1 to 4 correspond to Relational Expressions 1-1 to 4-1, respectively, and
   when the dielectric material satisfies any one or more of Relational Expressions 1 to 4, a corresponding Relational Expression among Relational Expressions 1-1 to 4-1 is additionally satisfied:

$0.108 \leq (M_{Tb}/M_{Dy})/M_3 \leq 0.800$     [Relational Expression 1-1]

$0.118 \leq (M_{Gd}/M_{Dy})/M_3 \leq 0.400$     [Relational Expression 2-1]

$0.054 \leq (M_{Sm}/M_{Dy})/M_3 \leq 0.118$     [Relational Expression 3-1]

$0.054 \leq (M_{Nb}/M_{Dy})/M_3 \leq 0.118$     [Relational Expression 4-1].

13. The multilayer ceramic electronic component of claim 11, further comprising:
   a fourth subcomponent including Mg, and
   $M_4/M_3$ which is a ratio of a content $M_4$ of the fourth subcomponent to a content $M_3$ of the third subcomponent satisfies a range of 0.125 or more and 0.500 or less.

14. The multilayer ceramic electronic component of claim 11, further comprising:
   a plurality of grains including the main component and a grain boundary disposed between two or more grains, wherein an average diameter D1 of a core portion of the grains is 5 nm or more and 100 nm or less, and an average diameter D2 of the grains is 50 nm or more and 600 nm or less.

* * * * *